United States Patent
Krauss (10) Patent No.: US 11,832,695 B2
(45) Date of Patent: Dec. 5, 2023

(54) HANDBAG PROVIDING DIFFERENT DEGREES OF EMF PROTECTION

(71) Applicant: Handbag Heidi LLC, Hunt Valley, MD (US)

(72) Inventor: Heidi Krauss, Hunt Valley, MD (US)

(73) Assignee: Handbag Heidi LLC, Hunt Valley, MD (US)

(*) Notice: Subject to any disclaimer, the term of this patent is extended or adjusted under 35 U.S.C. 154(b) by 439 days.

(21) Appl. No.: 16/728,499

(22) Filed: Dec. 27, 2019

(65) Prior Publication Data

US 2021/0196015 A1 Jul. 1, 2021

(51) Int. Cl.
*A45C 3/00* (2006.01)
*H04B 1/3888* (2015.01)
*A45C 13/02* (2006.01)
*A45C 3/06* (2006.01)

(52) U.S. Cl.
CPC .............. *A45C 3/001* (2013.01); *A45C 3/06* (2013.01); *A45C 13/02* (2013.01); *H04B 1/3888* (2013.01); *A45C 2003/002* (2013.01)

(58) Field of Classification Search
CPC ............................... A45C 3/06; H04B 1/3888
USPC ........................................................ 206/719
See application file for complete search history.

(56) References Cited

U.S. PATENT DOCUMENTS

| | | | | |
|---|---|---|---|---|
| 5,594,200 A | * | 1/1997 | Ramsey | H05K 9/0069 174/382 |
| 5,704,528 A | * | 1/1998 | Faure | A45F 3/04 190/110 |
| 6,121,544 A | * | 9/2000 | Petsinger | G06K 19/005 150/147 |
| 7,601,921 B2 | * | 10/2009 | Schroader | H05K 9/0043 174/382 |
| 8,412,123 B2 | * | 4/2013 | Foster | H04K 3/68 455/90.3 |
| 8,618,426 B2 | | 12/2013 | Malone | |
| 9,460,309 B2 | * | 10/2016 | Zar | B65D 33/00 |

(Continued)

FOREIGN PATENT DOCUMENTS

WO WO-2019195397 A1 * 10/2019 ............... A45F 4/02

OTHER PUBLICATIONS

International Search Report and Written Opinion issued in PCT Application No. PCT/US2020/067162 dated Apr. 8, 2021 (7 pages).

(Continued)

*Primary Examiner* — John K. Fristoe, Jr.
*Assistant Examiner* — Justin Caudill
(74) *Attorney, Agent, or Firm* — Nixon & Vanderhye P.C.

(57) ABSTRACT

Wearable or carryable items have multiple compartments that provide RF shielding for personal electronic devices. Different compartments provide different degrees of shielding. Depending on the compartment you use, you may continue to have the ability to receive messages while your body will be protected from the EMF RF exposure, or you can make the device unavailable to the RF network altogether. Wherever you decide to store your devices, this will encourage awareness of usage. You can time-block your usage and now make room for fully present, engaging human experiences. This practice will have an immediate and ever deepening effect on the user's personal and professional life and create a healthier, happier more emotionally balanced population.

18 Claims, 11 Drawing Sheets

(56) References Cited

U.S. PATENT DOCUMENTS

| | | | | |
|---|---|---|---|---|
| 9,979,427 B2* | 5/2018 | Thomas | ............... | H04B 1/3888 |
| 10,092,072 B2 | 10/2018 | Capps-Tate | | |
| 10,245,808 B2* | 4/2019 | Miller | ............... | A45C 3/001 |
| 2005/0092504 A1* | 5/2005 | Walthall | ............... | H05K 9/0088 |
| | | | | 174/394 |
| 2007/0142103 A1* | 6/2007 | Livne | ............... | G06F 1/1628 |
| | | | | 455/575.5 |
| 2009/0266724 A1* | 10/2009 | Norman | ............... | A45C 11/182 |
| | | | | 206/39 |
| 2009/0272570 A1* | 11/2009 | Chen | ............... | H01C 1/06 |
| | | | | 174/350 |
| 2011/0309121 A1* | 12/2011 | Dooley | ............... | A45C 7/0086 |
| | | | | 224/576 |
| 2012/0047631 A1* | 3/2012 | Connolly | ............... | A41D 27/02 |
| | | | | 206/320 |
| 2012/0114270 A1* | 5/2012 | Roberts | ............... | H04B 1/3838 |
| | | | | 383/109 |
| 2014/0120992 A1* | 5/2014 | Kershenstein | ............ | A45C 3/00 |
| | | | | 455/575.8 |
| 2014/0284095 A1* | 9/2014 | Behuniak | ............. | H04B 1/3888 |
| | | | | 174/377 |
| 2014/0366250 A1* | 12/2014 | Barone | ............... | H05K 9/0043 |
| | | | | 2/251 |
| 2015/0027831 A1* | 1/2015 | Case | ............... | A45C 3/001 |
| | | | | 190/101 |
| 2015/0158653 A1* | 6/2015 | Trombino | ............... | A45C 13/18 |
| | | | | 206/719 |
| 2018/0070693 A1* | 3/2018 | Bloomfield | ............ | A45C 3/001 |
| 2018/0140063 A1* | 5/2018 | Gomez | ............... | A45F 5/021 |
| 2019/0090390 A1* | 3/2019 | Judy | ............... | A45C 13/1069 |
| 2019/0313718 A1* | 10/2019 | Voy | ............... | A47G 9/0238 |

OTHER PUBLICATIONS

Brodeur, "Annals of Radiation", The New Yorker, Jun. 1989, https://www.newyorker.com/magazine/annals-of-radiation (2 pages).
Chapman et al., "Mathematics of the Faraday Cage", SIAM Review, Society for Industrial and Applied Mathematics, 2015, pp. 398-417, vol. 57, No. 3 (20 pages).
Brzezinski et al., "Textile materials for electromagnetic field shielding made with the use of nano- and micro-technology", Central European Journal of Physics, Nov. 21, 2012, https://doi.org/10.2478/s11534-012-0094-z (9 pages).
International Preliminary Report on Patentability issued in PCT Application No. PCT/US2020/067162 dated Jul. 7, 2022 (6 pages).

* cited by examiner

HANDBAG PROVIDING DIFFERENT DEGREES OF EMF PROTECTION

CROSS-REFERENCES TO RELATED APPLICATIONS

None.

STATEMENT REGARDING FEDERALLY SPONSORED RESEARCH OR DEVELOPMENT

None.

BACKGROUND & SUMMARY

Most of the population is addicted to their electronic devices. Devices are to be used as a tool and should not rule. From teenagers to adults, most of the world goes through their day waiting for the next ping or buzz from their devices. Very few people on the planet Earth need to be on call 24/7. We have created an epidemic of people whose neural wiring and thought patterns are less capable of deep problem solving and whose nervous systems are less capable managing human conflict.

Most people now have difficulty being present in their lives and this is moving us away from meaningful human experiences. Just walk down any modern city street or enter any restaurant and you will see that most people are glued to their phones and are oblivious to their surroundings and the people they are supposed to be with. Many people are sadly living life through their phones and devices and not truly engaging with other human beings. This is a danger to society. We are training the world's synapses to function at the level of a text message.

Such constant device use poses other dangers as well. The population's exposure to EMF RF is at an all time high. Humans are getting bombarded every day and in every way with close range high energy electromagnetic radiation while carrying their devices to and from work and play. Multiple devices are toted in their travel bags, totes, purses and belt bags also known as fanny packs. We are electromagnetic beings and the onslaught of the EMF RF signals are disruptive to our neural wiring and human health.

While I am unaware of any conclusive FDA study, there are many many reports in reputable scientific journals citing the potential negative effects of EMF RF exposure. For readable material directed to lay people, see e.g., Brodeur, "The Cancer at Slater School" (Nov. 29, 1992); "Calamity on Meadow Street" (Jul. 1, 1990); "The Hazards of Electromagnetic Fields III—Video Display Terminals" (Jun. 18, 1989); "The Hazards Of Electromagnetic Fields II-Something Is Happening" (Jun. 11, 1989); and "The Hazards Of Electromagnetic Fields I-Power Lines" (Jun. 4, 1989), The New Yorker, At newyorker.com/magazine/annals-of-radiation incorporated herein by reference.

It is common sense that less exposure is better. I believe EMF RF exposure may be the next smoking. There is such an immense amount of money involved that the FDA will most likely never prove conclusively that EMF RF exposure is linked to cancer, autoimmune disorders, hormonal issues, neural and nervous system breakdowns, and the list goes on. I do not need this data to know I need to protect myself and hopefully others.

BRIEF DESCRIPTION OF THE DRAWINGS

These and other features and advantages will be better understood by referring to the following detailed description in conjunction with the drawings, of which.

DETAILED DESCRIPTION OF EXAMPLE NON-LIMITING EMBODIMENTS

The technology herein encompasses several types of wearable and/or carryable articles including bags and belt bags with a protective lining throughout the entire bag or parts thereof with multiple compartments. By carrying your tablet iPad, laptop, phone, etc., in one of the bags, your exposure is lessened and/or blocked. For example, while you're carrying a typical shoulder bag, your breast tissue exposure is lessened. While you're traveling and you may sit with your bag on your lap on the train or plane or car, exposure to your internal organs is lessened.

While Faraday shields in wallets exist to protect identity theft, shields exist in brief cases to protect against conversations from being recorded and shields exist on cell phone cases, nothing exists in an everyday bag, purse, or belt bag/fanny pack, where EMF/RF shields are used in the entire structure of the bag to allow for flexibility in your protection level from the bombardment of EMF RF signals. The user chooses where they place their devices and what type of blockage is desired.

One example non-limiting embodiment shown in FIGS. 1-7 is a bag with multiple flexible shielded compartments. One compartment allows for nearly total concealment. Other compartments provide less (but still some) electromagnetic shielding. Still other compartments may provide no shielding at all. Depending on the compartment you use, you can provide the ability to receive electronic messages carried by electromagnetic waves while your body will be protected from the EMF RF exposure. Wherever you decide to store your devices, this will encourage awareness of usage. You can time-block your usage and now make room for fully present, engaging human experiences. This practice will have an immediate and ever deepening effect on the user's personal and professional life. Such bags will create a healthier, happier more emotionally balanced population. The lining in bags, belt bags, etc will encourage better device habits. The population needs to detox physically and mentally.

Figure 1:
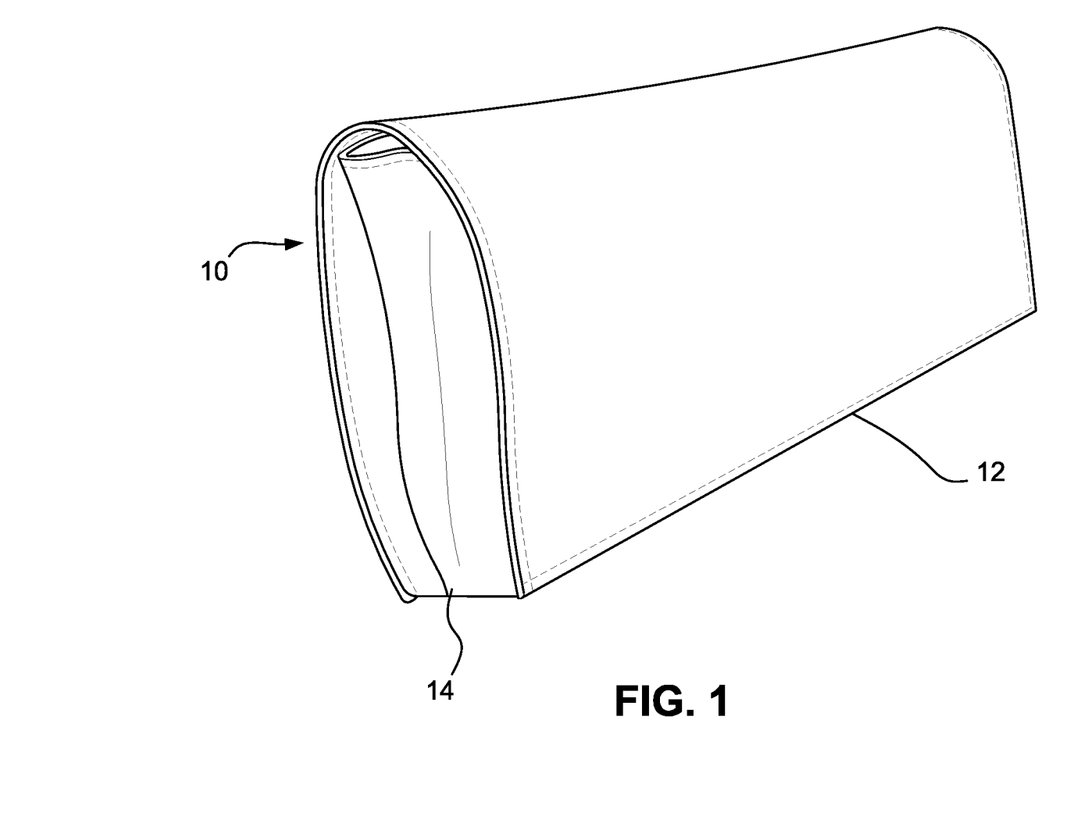
FIG. 1 shows an example flap closure clutch handbag.
Figure 2:
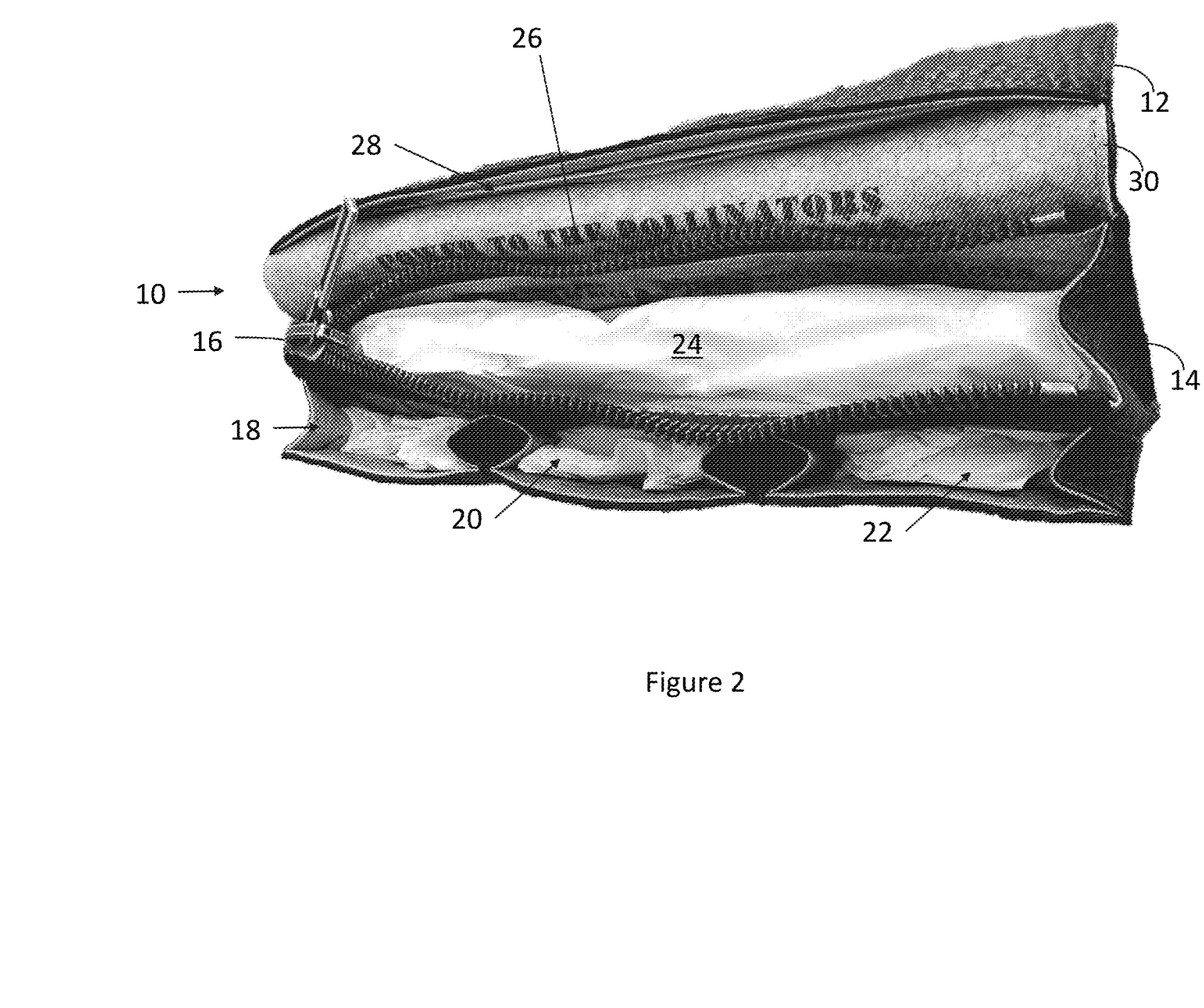
FIG. 2 shows the FIG. 1 clutch handbag with its flap open to expose inner pockets.
Figure 3:
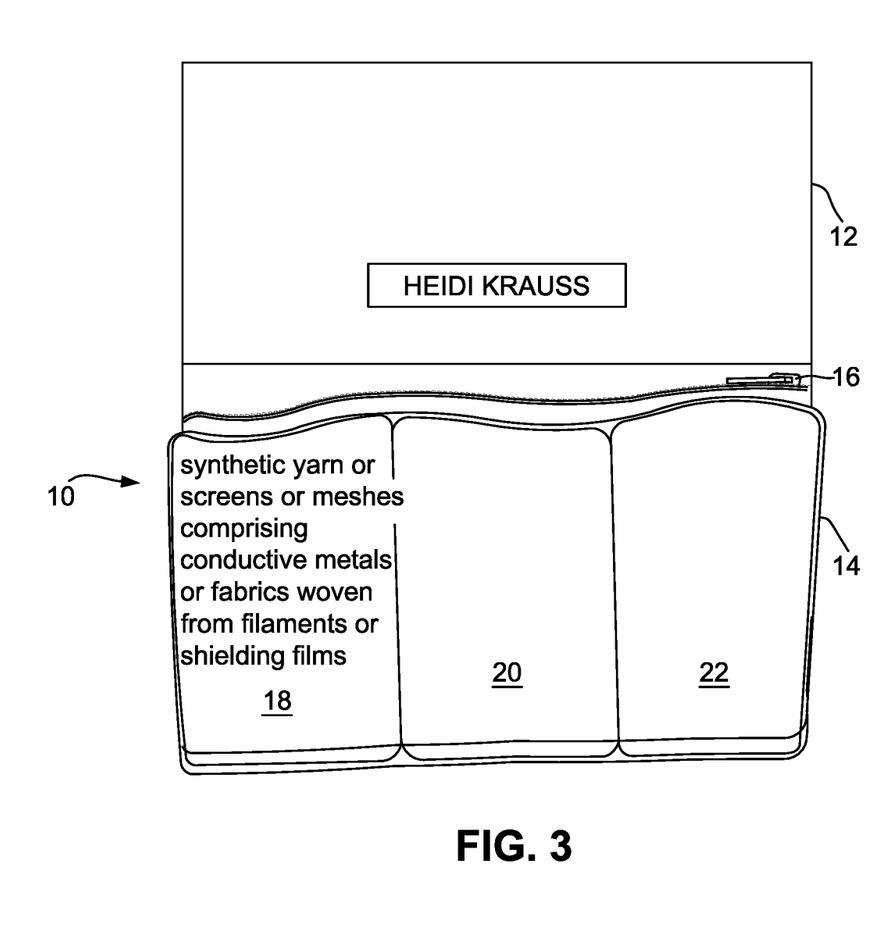
FIG. 3 is a schematic front elevated view of the FIG. 1 handbag with flap open.
Figure 4:
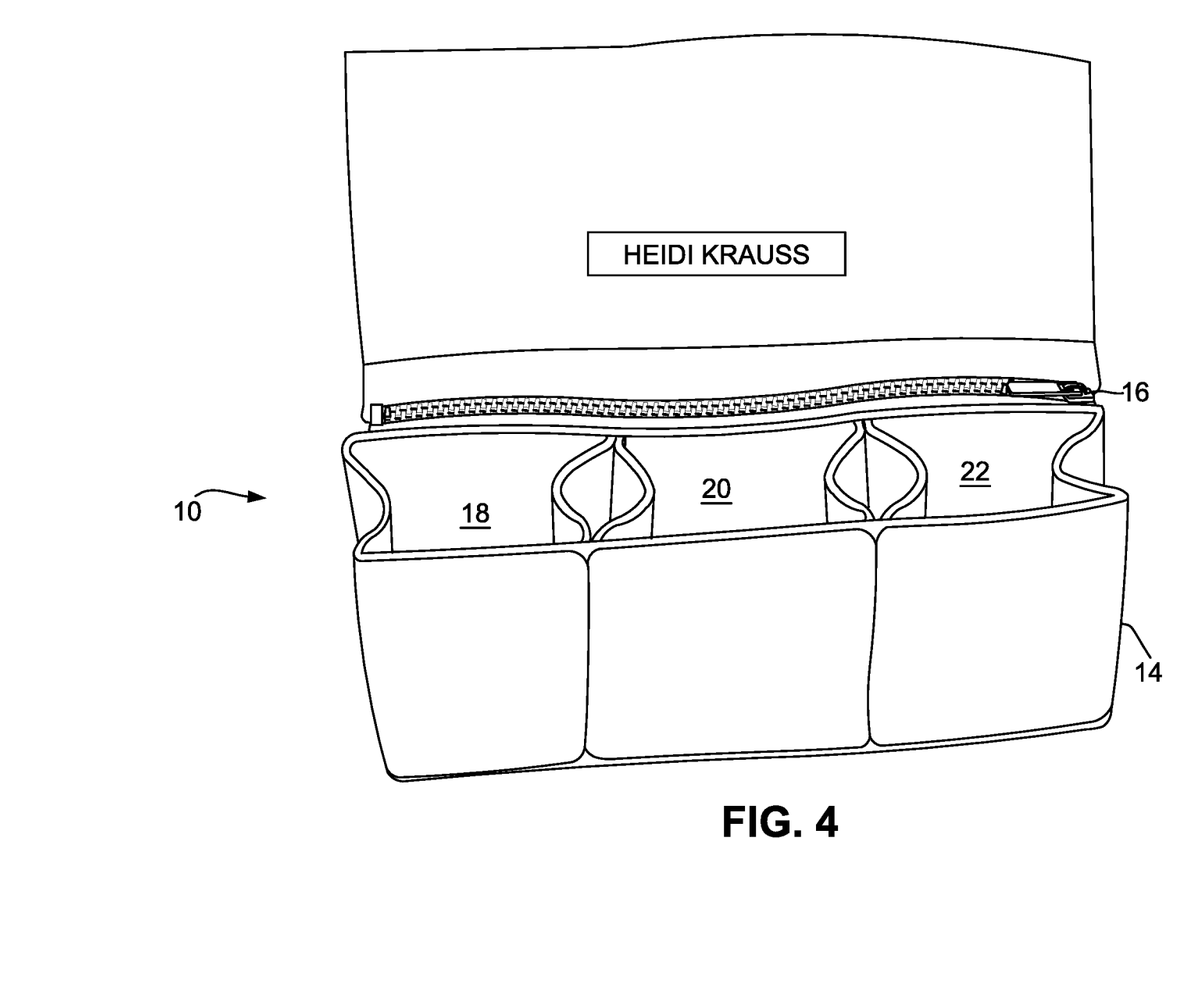
FIG. 4 is an elevated perspective view of the FIG. 1 handbag looking into internal pockets.
Figure 5:
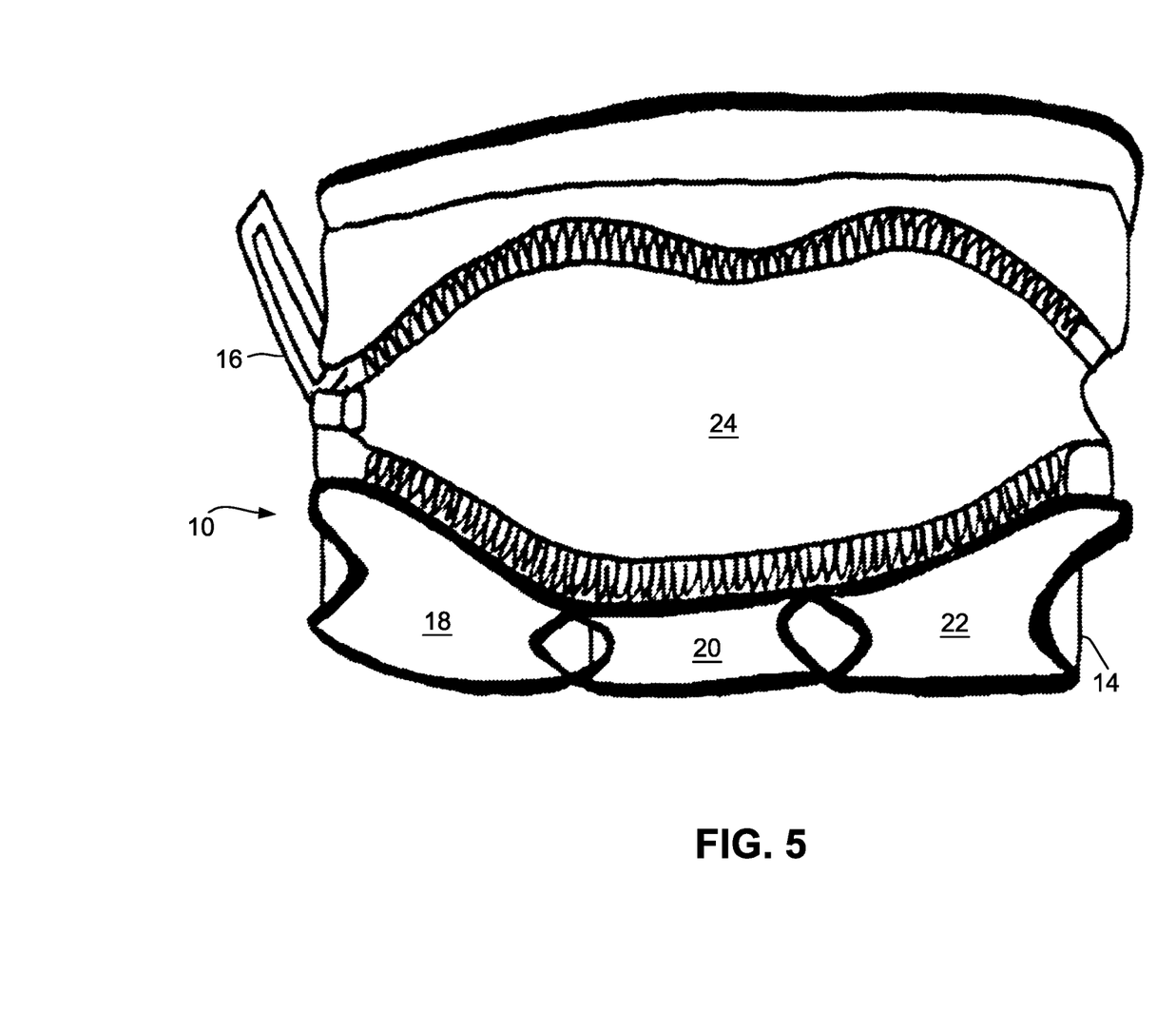
FIG. 5 is an overhead view of the FIG. 1 handbag looking straight down into the bag.
Figure 6:
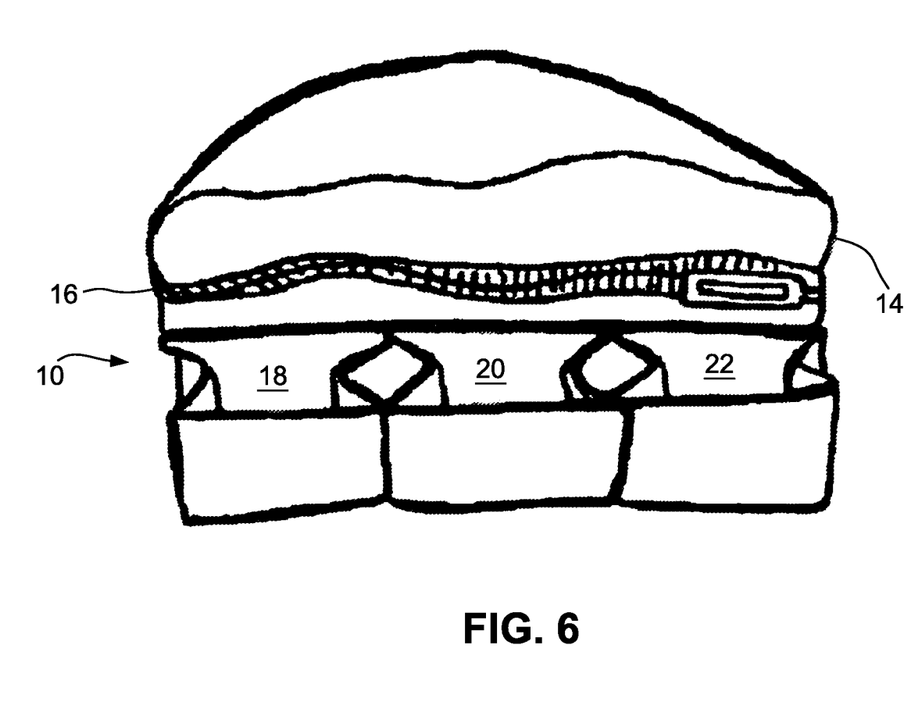
FIG. 6 shows another bag in the same view as FIG. 4 but including an additional large pocket inside the flap.
Figure 7:
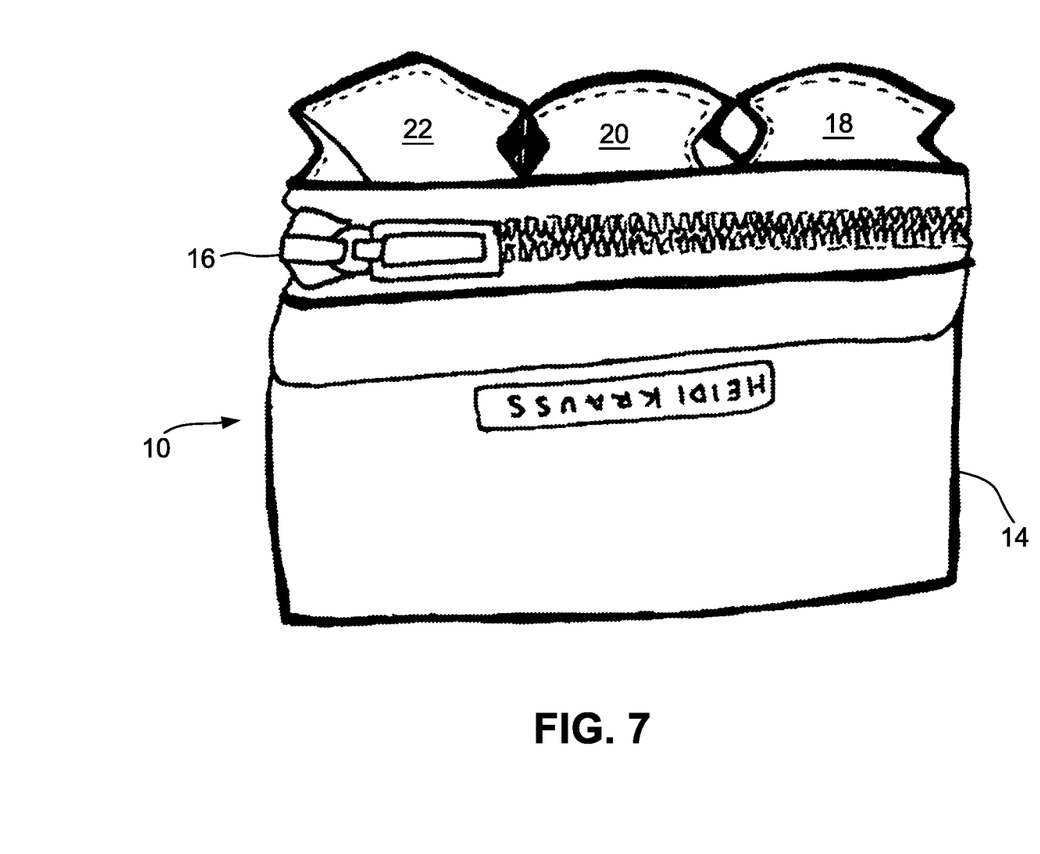
FIG. 7 is a side view of the FIG. 6 bag showing three front open pockets.

In more detail, FIG. 1 shows an example flap closure clutch handbag 10 including a flap 12 and a shell 14. As FIG. 2 shows, flap 12 can be opened to expose one or more compartments 14 within shell 14. In the example shown, shell 14 contains three front pockets 18, 20, 22 and a main pocket 24 that can be closed by a zipper 16. An additional pocket 28 can be provided as part of flap 12. If desired an additional, rear pocket 26 can also be provided.

Some or all of pockets 18, 20, 22, 24, 28 are structured as Faraday shields. In particular, these pockets are constructed as electrical enclosures that provide electromagnetic shielding for items placed within them. The shielding prevents most of the EMF (electromagnetic fields) generated by devices within the shield from emanating outside the shield, and also prevents most of the EMF generated outside the shield from penetrating the shield to the space within.

The Faraday shield, which was discovered by Michael Faraday in the early $19^{th}$ Century, works generally as follows. The shield provides a conductive enclosure. When an electromagnetic (e.g., radio frequency or RF) signal impinges on a portion of the enclosure, the signal induces an electric field on the part of the enclosure that has been exposed to the signal. Because the enclosure is conductive, electrons are able to move or migrate within the enclosure. Therefore, electrons migrate from other parts of the enclosure to the portion where the electric field has been induced, causing that portion to become negatively charged—a phenomenon known as electrostatic induction. The migrating electrons leave behind neutrons that are positively charged, causing that or those other portion(s) of the enclosure to become positively charged. The positive and negative charges cancel one another out, resulting in a zero net charge. The shield adapts very quickly to changes in the electromagnetic signal, which results in a continuous net cancellation of the induced electric field. As a consequence, RF signals from outside the conductive enclosure substantially do not penetrate the enclosure to reach the space within the enclosure, and any RF signals generated within the enclosure substantially do not penetrate the enclosure to reach the space outside the enclosure.

The effectiveness of the shield depends on various factors such as the surface coverage of the shield (i.e., whether the shield is continuous or discontinuous), the conductivity of the material the enclosure is made of, and the frequency of the radio signals. Such shields are typically more effective at mobile and portable device UHF radio frequencies such as 824-894 MHz and 1850-1990 MHz used for cellular telephony; 900 MHz, 2.4 GHz, 3.6 GHz, 4.9 GHz, 5 GHz, 5.9 GHz and 60 GHz used for 802.11 WiFi communications; and 2400-2402 MHz and 2480-2483.5 MHz used for Bluetooth. Nevertheless, the shielding is not perfect, and it is possible to degrade the shielding by for example, altering the mesh size of a mesh-based shield (each cell of the mesh may be modeled as a wafeguide at the frequency of interest); changing the geometric configuration of the mesh; changing the conductivity of the material used for the shield; changing the thickness of the shielding material; and/or intentionally providing discontinuities or gaps in the shield. For example, whereas continuous shields essentially attenuate all wavelengths shorter than the skin depth, holes in a shield enclosure may permit shorter wavelengths to pass through or set up evanescent fields (oscillating fields that do not propagate as EM waves) just beneath the surface. For a more detailed discussion, see e.g., Chapman et al, "Mathematics of the Faraday Cage", SIAM Review, Vol. 57, No. 3, pp. 398-417, Society for Industrial and Applied Mathematics (2015). Such changes can impact the amount of shielding provided so the attenuation factor is less than 10 (20 dB); between 10 and 15; between 15 and 20; between 20 and 50; between 50 and 100; between 100 and 500; between 500 and 1000 (60 dB); between 1000 and 10000 (80 dB); and so forth.

In example non-limiting embodiments, different pockets have different amounts or degrees of electromagnetic shielding to provide different degrees of attenuation. For example:
pocket 18 could be designed to have an attenuation factor less than 10 (20 dB);
pocket 20 could be designed to have an attenuation factor of between 10 and 15; between 15 and 20; between 20 and 50; or between 50 and 100;
pocket 22 could be designed to have an attenuation factor of between 100 and 500 or between 500 and 1000 (60 dB);
pocket 24 could be designed to have an attenuation factor of between 1000 and 10000 (80 dB);
and so forth.

Providing different attenuation factors and associated shielding effectiveness for different pockets provides additional flexibility in a single handbag 10. For example, if you don't want to be disturbed and/or you want to protect yourself from being tracked, you can place your mobile phone in a high attenuation pocket. If, on the other hand, you don't mind being disturbed but you wish to minimize the emissions from your mobile phone, you can put your phone in a medium attenuation pocket (the attenuation in some embodiments is designed to take into account the "power boost" function of many mobile phones that cause them to increase their output power when reception is poor). And if you want your mobile device to have free and unrestricted access to the airwaves for WiFi, cellular and Bluetooth® signals, you can place the mobile device in a pocket that provides low attenuation.

As your needs change, it is possible to simply move your mobile device from one pocket to another. For example, if you are expecting an important call, you can place your mobile phone in a low attenuation pocket. But if you are about to engage in mindfulness meditation, you can temporarily move your mobile phone to a high attenuation pocket for the duration of the meditation. Once your meditation is over, you can move your mobile phone back to the low attenuation pocket.

In the example shown, a decorative, organic fabric 30 can be sewn or otherwise bonded over top of an EMF RF blocking fabric to provide a luxurious look and feel. In other embodiments, the luxurious outer fabric can itself comprise an EMF blocking fabric by weaving it with conductive yarns which can also be decorative (for example, silver or gold). The EMF blocking fabric can have any of various configurations such as:

silver-coated or gold-coated synthetic yarn such as metallic-coated nylon or rayon,
polyaniline-coated nylon lycra,
screens or meshes comprising conductive metals such as silver, gold, copper and/or aluminum;
fabrics woven from filaments comprising a ferromagnetic core and electroconductive cladding;
fabrics coated with or comprising certain types of nanoparticles such as described in Brzeziński et al, "Textile materials for electromagnetic field shielding made with the use of nano- and micro-technology" Published Online: 2012-11-21|DOI: doi.org/10.2478/s11534-012-0094-z
electrically conductive elastomers such as nickel-coated carbon (Ni/C), silver-plated aluminum (Ag/Al), passivated aluminum (IA), silver-plated copper (Ag/Cu), silver (Ag), silver-plated glass (Ag/Al), and silver-plated nickel (Ag/Ni) (see e.g., emfadvice.com/emf-shielding-materials-fabrics/);
shielding films made of amorphous cobalt alloys or laminated cobalt strips;
other.

Figure 8A:
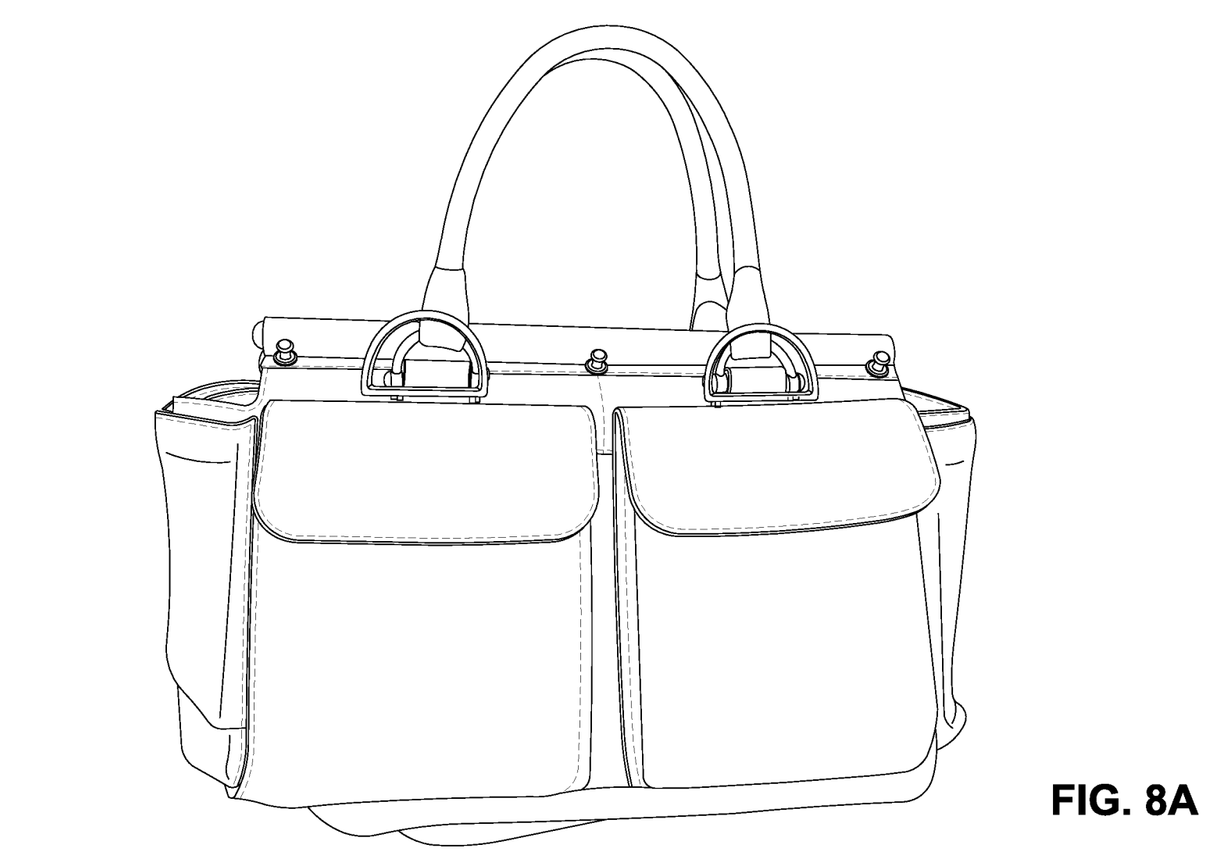
FIGS. 8A, 8B, 8C, 8D show additional handbag embodiments.
Figure 8B:
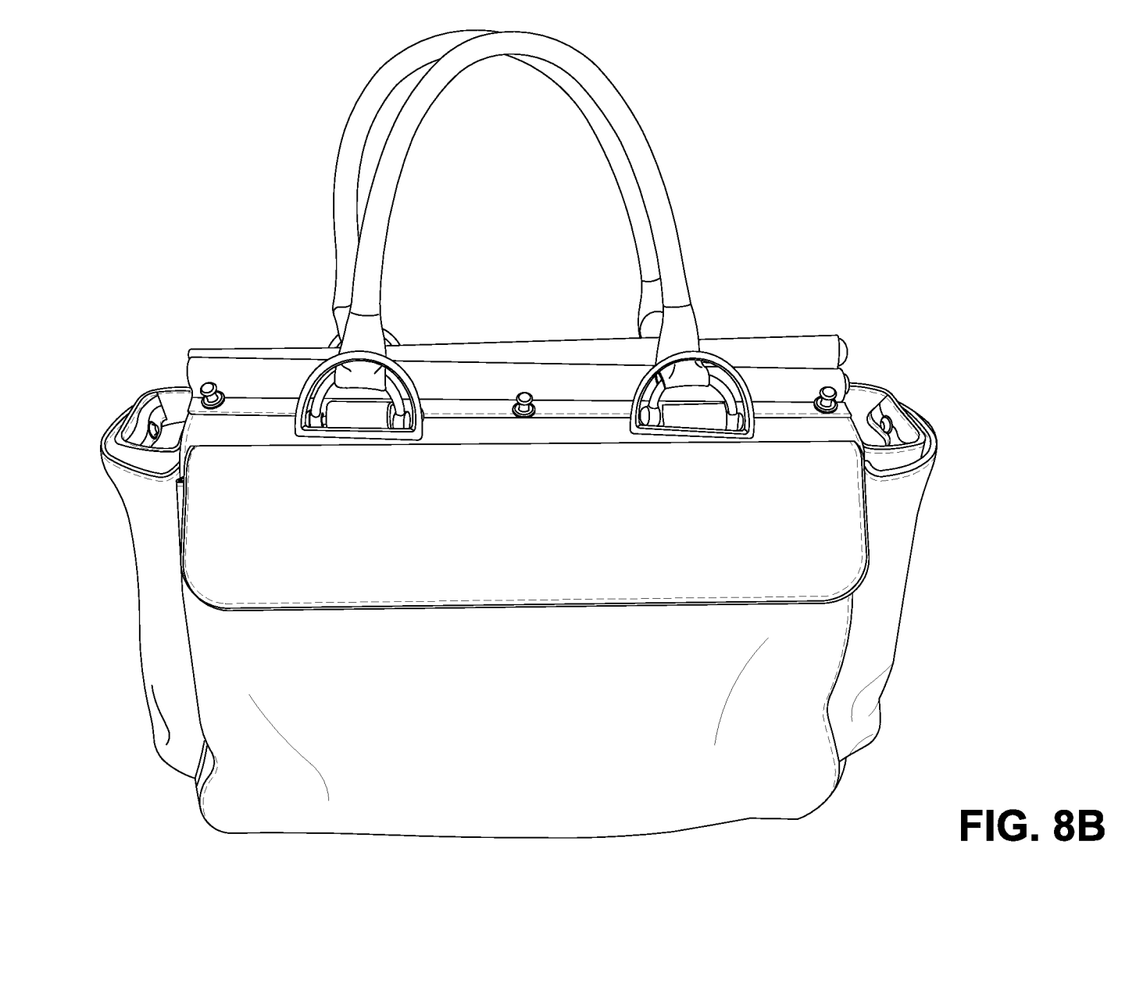
Figure 8C:
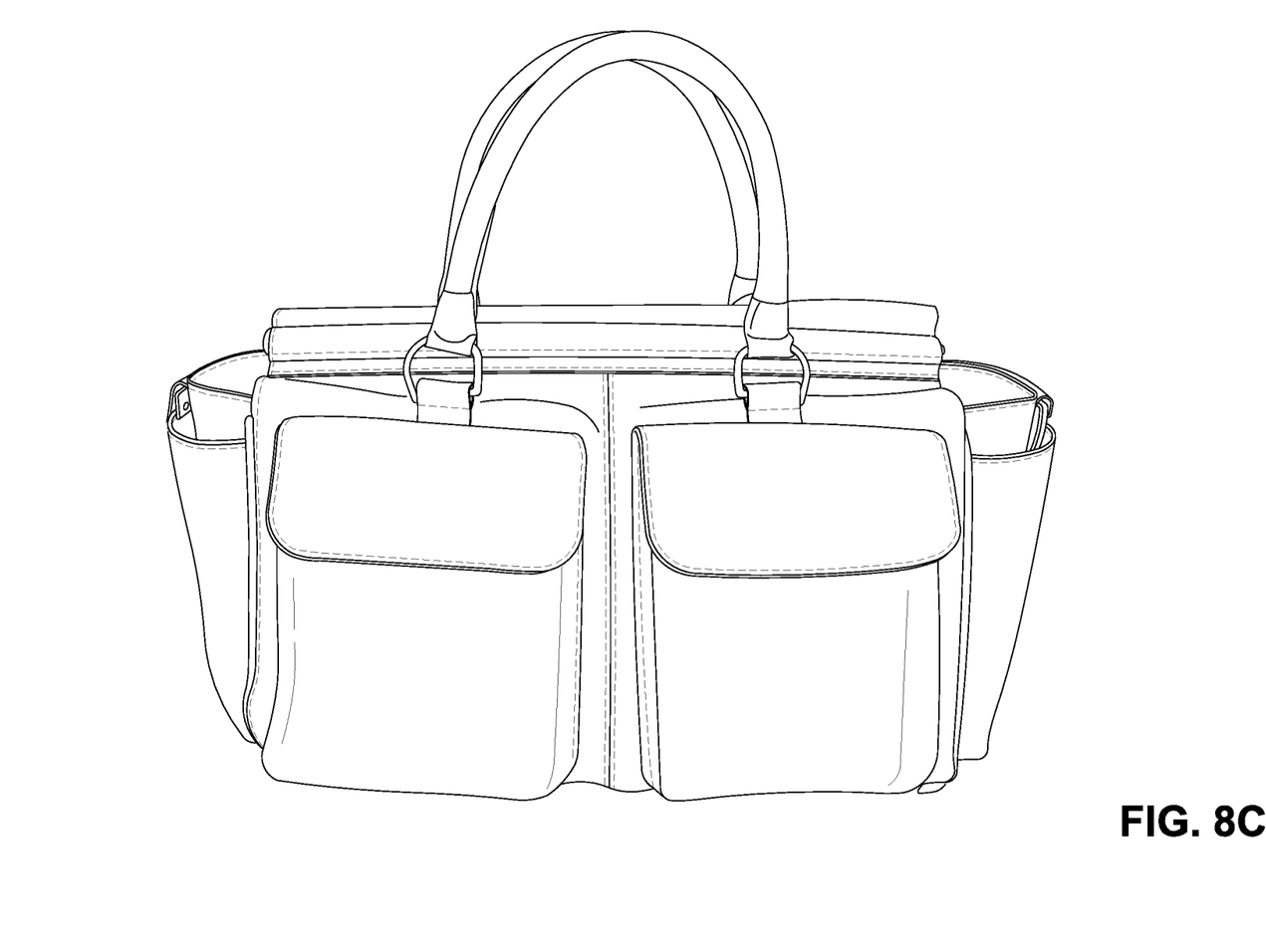
Figure 8D:
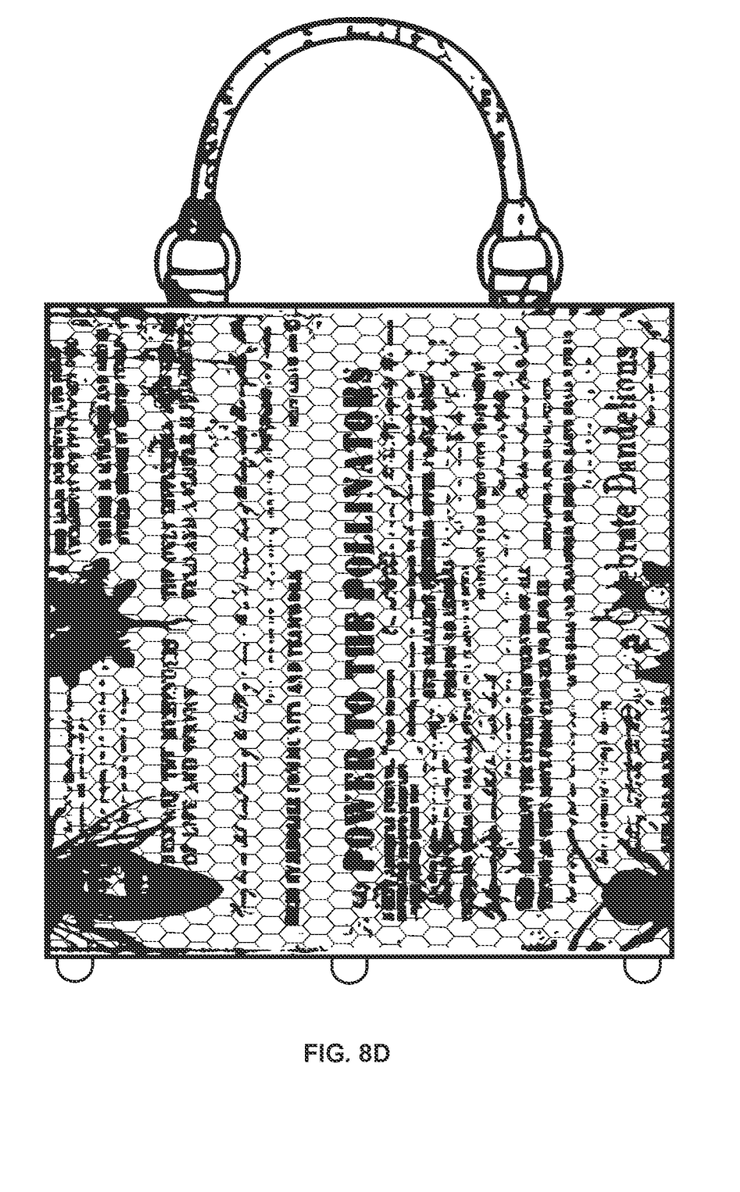

The form factor of the handbag or other garment or carryable shown in FIG. 1 is not limiting. See for example other variations such as shown in FIGS. 8A, 8B, 8C and 8D. FIG. 8D is a tote bag All publications cited herein are incorporated by reference as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A handbag with multiple shielded compartments providing different attenuations to radio frequency radiation for the same electronic device, comprising:
    a first pocket or compartment dimensioned to accommodate an electronic device;
    a first Faraday shielding material enveloping the first pocket or compartment, the first Faraday shielding material providing nearly total electromagnetic concealment for the electronic device when disposed within the first pocket or compartment;
    a second pocket or compartment dimensioned to accommodate the electronic device; and
    a second Faraday shielding material enveloping the second pocket or compartment, the second Faraday shielding material providing less but still some electromagnetic shielding so that the electronic device when disposed in the second pocket or compartment has the ability to receive electronic messages carried by electromagnetic waves while preventing most of the electromagnetic radio frequency radiation generated by the electronic device from emanating outside the second pocket or compartment when the electronic device is disposed in the second pocket or compartment;
    wherein the first and second Faraday shielding materials are structured to provide different attenuation factors to radio frequencies in the frequency ranges of 824-894 MHz and/or 1850-1990 MHz, the first pocket or compartment having an attenuation factor that is at least ten times the attenuation factor of the second pocket or compartment.

2. The handbag of claim 1 wherein the second Faraday shielding material is structured to provide an attenuation factor of less than 10 (20 dB) in the frequency ranges of 824-894 MHz and/or 1850-1990 MHz.

3. The handbag of claim 1 wherein the second Faraday shielding material is structured to provide an attenuation factor of between 10 and 15 in the frequency ranges of 824-894 MHz and/or 1850-1990 MHz.

4. The handbag of claim 1 wherein the second Faraday shielding material is structured to provide an attenuation factor of between 15 and 20 in the frequency ranges of 824-894 MHz and/or 1850-1990 MHz.

5. The handbag of claim 1 wherein the second Faraday shielding material is structured to provide an attenuation factor of between 20 and 50 in the frequency ranges of 824-894 MHz and/or 1850-1990 MHz.

6. The handbag of claim 1 wherein the second Faraday shielding material is structured to provide an attenuation factor of between 50 and 100 in the frequency ranges of 824-894 MHz and/or 1850-1990 MHz.

7. The handbag of claim 1 wherein the first Faraday shielding material is structured to provide an attenuation factor of between 100 and 500 in the frequency ranges of 824-894 MHz and/or 1850-1990 MHz.

8. The handbag of claim 1 wherein the first Faraday shielding material is structured to provide an attenuation factor of between 500 and 1000 (60 dB) in the frequency ranges of 824-894 MHz and/or 1850-1990 MHz.

9. The handbag of claim 1 wherein the first Faraday shielding material is structured to provide an attenuation factor of between 1000 and 10000 (80 dB) in the frequency ranges of 824-894 MHz and/or 1850-1990 MHz.

10. The handbag of claim 1 wherein the handbag comprises at least four internal compartments.

11. The handbag of claim 1 wherein the first Faraday shielding material comprises at least one of the following:
    silver-coated or gold-coated synthetic yarn comprising metallic-coated nylon or rayon,
    polyaniline-coated nylon lycra,
    screens or meshes comprising conductive metals such as silver, gold, copper and/or aluminum;
    fabrics woven from filaments comprising a ferromagnetic core and electroconductive cladding;
    fabrics coated with or comprising certain types of nanoparticles;
    electrically conductive elastomers selected from the group consisting of nickel-coated carbon (Ni/C), silver-plated aluminum (Ag/Al), passivated aluminum (IA), silver-plated copper (Ag/Cu), silver (Ag), silver-plated glass (Ag/Al), and silver-plated nickel (Ag/Ni);
    shielding films made of amorphous cobalt alloys or laminated cobalt strips.

12. The handbag of claim 1 further including a decorative, organic fabric sewn or otherwise bonded over top of the first Faraday shielding material.

13. The handbag of claim 1 wherein the first Faraday shielding material comprises an electromagnetic radiation blocking fabric woven with conductive yarn.

14. A handbag comprising:
    a shell comprising first and second ends, a front surface that extends between the first and second ends, and at least one movable flap that is movable between an open flap position and a closed flap position;
    a first compartment disposed within the shell and extending between the first and second ends of the shell, the first compartment comprising a zippered opening extending between the first and second ends of the shell, the zippered opening being structured to enable the first compartment to be selectively unsealed and resealed, the first compartment comprising a first fabric shield that envelopes the first compartment to a first attenuation for electromagnetic energy emanated by a device when disposed within the first compartment; and
    a plurality of front pockets disposed on the shell front surface, the plurality of front pockets each defining an opening facing the at least one flap when the at least one flap is disposed in the closed flap position, the at least one flap enabling at least one of the plurality of front pocket openings to be accessible from outside the shell when the at least one flap is disposed in the open flap position, the flap closing off access to at least one of the plurality of front pocket openings from outside the shell when the at least one flap is disposed in the closed flap position, the at least one of the plurality of front pockets being constructed as an electrical enclosure that provides electromagnetic shielding for the device when disposed therein, the electromagnetic shielding providing a second attenuation less than the first attenuation for electromagnetic energy emanated by the device when disposed within the electrical enclosure;

wherein the first fabric shield and the electrical enclosure are structured to provide different attenuation factors to radio frequencies in the frequency range of 824-894 MHz and/or 1850-1990 MHz.

15. The handbag of claim 14 wherein at least another of the plurality of front pockets provides a third attenuation less than the second attenuation for electromagnetic energy emanated by the device when disposed within the at least another of the plurality of front pockets.

16. The handbag of claim 15 wherein the device comprises a mobile phone and each of the first pocket and the plurality of front pockets are dimensioned to accept the mobile phone so that in use, the mobile phone is movable between the first pocket and any of the plurality of front pockets to select between at least three different radio frequency attenuations for radio signals to/from the mobile phone.

17. The handbag of claim 15 wherein the at least one flap is structured to make the zippered opening inaccessible when the at least one flap is moved to the closed position.

18. The handbag of claim 15 further including a pocket defined within an inner surface of the at least one flap.

\* \* \* \* \*